June 12, 1923.
F. A. YOUNG
SAFETY HOOK
Filed June 1, 1922
1,458,453
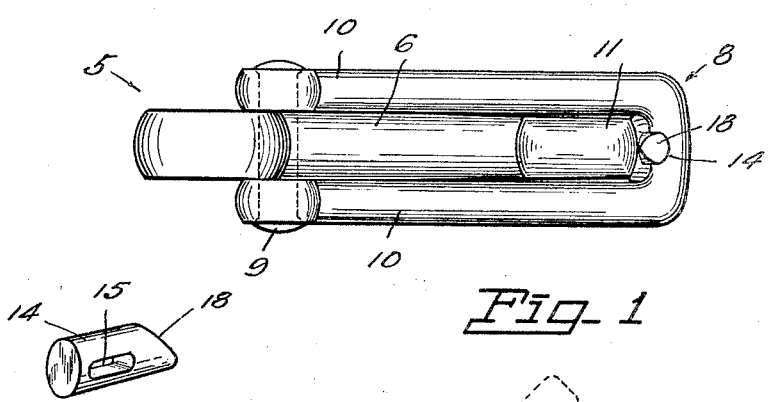
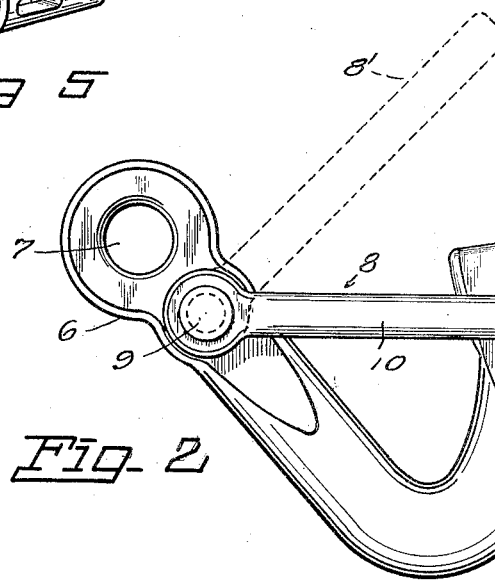
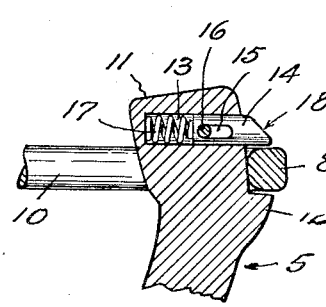
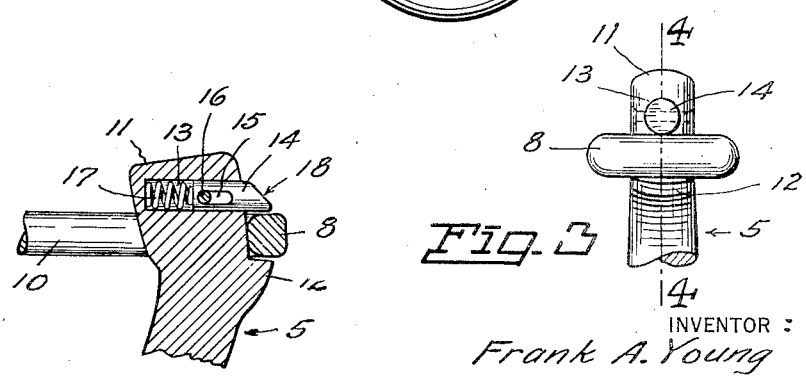
INVENTOR:
Frank A. Young
BY
Pierre Barnes
ATTORNEY Patented June 12, 1923.

1,458,453

UNITED STATES PATENT OFFICE.

FRANK A. YOUNG, OF SULTAN, WASHINGTON, ASSIGNOR OF ONE-HALF TO KENNETH S. STARTUP, OF SULTAN, WASHINGTON.

SAFETY HOOK.

Application filed June 1, 1922. Serial No. 565,113.

*To all whom it may concern:*

Be it known that I, FRANK A. YOUNG, a citizen of the United States, residing at Sultan, in the county of Snohomish and State of Washington, have invented certain new and useful Improvements in Safety Hooks, of which the following is a specification.

This invention relates to safety hooks and is intended, more especially, to be employed as butt-hooks, so called, upon ground or overhead cables of logging apparatus.

The object of my invention is the improvement of this class of hooks to increase their utility and strength.

Other objects and advantages of the invention will appear in the following specification.

The invention consists in the novel construction, adaptation and combination of parts hereinafter described and claimed.

In the accompanying drawings,—

Figure 1 is a top plan view of a safety hook embodying my invention. Fig. 2 is a side elevation of the same, showing in dotted lines the link element in its open position. Fig. 3 is a fragmentary end elevation of Figs. 1 and 2, and Fig. 4 is a sectional view through 4—4 of Fig. 3. Fig. 5 is a perspective view of the locking element, shown detached.

In carrying out the present invention, I provide a hook member 5 having at one end of its shank 6 an eye 7 to receive a hauling or hoisting cable, not shown.

8 represents a U-shaped link which is pivotally connected to the shank 6 in proximity with the eye 7 by means of a pin 9 extending through said shank and the link arms 10 which are disposed at opposite sides of the shank. Said link is of a length to have its loop end engage about the hook bill 11. Projecting forwardly from said bill is a lug 12 which serves as a bracket for supporting the free end of the link.

At an elevation above the bracket 12 of the thickness at least of the loop end of the link, the bill 11 is provided with a bore 13 disposed parallel, or nearly so, with the link when the latter occupies the position in which it is represented by full lines in Fig. 2.

Provided in said bore is a lock bolt 14 arranged for movements axially thereof as limited by the length of a slot 15 provided in the bolt with respect to a pin 16 which extends through the slot and engaged in the bill at diametrically opposite sides of the bore 13.

The bolt 14 is yieldingly retained in its outermost position by means of a spring such as 17 acting against the inner end of the bolt. The outer end of said bolt is chamfered to afford a sloping face 18 whereby the bolt is forced inwardly by the link 8 in engaging such face when the link is swung from its open position—as indicated, for example, by dotted line $8^1$, Fig. 1—to its engaged position with respect to the hook bill. The link 8 is disengaged by swinging the same from the hook bill subsequent to retracting the bolt 14 which may be conveniently accomplished with the operator's thumb.

From the foregoing explanation taken with the drawings, it will be apparent that the link 8 acts to strengthen the hook by preventing the latter from being elongated when subjected to an excessive tensile strain.

When held by the bolt 14 in its engaged position, the link serves to close the hook opening and prevent any accidental displacement of the load cable, choker, or the like from the hook.

What I claim, is,—

1. The combination with a hook, of a substantially U-shaped link pivotally connected to the hook shank and arranged to be swung into position to extend across the hook opening to embrace the hook-bill, and a spring-pressed bolt mounted in the hook-bill and engageable against the upper surface of the link for releasably securing the link in its engaged position.

2. The combination of a hook having a bore in the bill thereof, a latch bolt provided in said bore, a link pivotally connected to the hook-shank and engageable about the hook-bill, and a spring provided in the hook-bill to render said bolt operable for releasably securing said link to the hook-bill below the bore in the latter.

3. The combination with a hook, of a link pivotally connected to the hook-shank and engageable with the hook-bill, said hook-bill being provided with a bracket element for supporting an end of said link, and a spring pressed bolt provided in the hook-bill for releasably securing said link in its engaged position with the hook-bill.

Signed at Seattle, Washington, this 16th day of May, 1922.

FRANK A. YOUNG.

Witnesses:
WM. CAMPBELL,
B. A. LUND.